(12) United States Patent
Weigand et al.

(10) Patent No.: US 7,162,865 B2
(45) Date of Patent: Jan. 16, 2007

(54) METHOD AND ARRANGEMENT FOR CONTROLLING A DRIVE UNIT HAVING AN INTERNAL COMBUSTION ENGINE

(75) Inventors: Rainer Weigand, Ludwigsburg (DE); Karl Dums, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 10/700,538

(22) Filed: Nov. 5, 2003

(65) Prior Publication Data
US 2004/0103646 A1    Jun. 3, 2004

(30) Foreign Application Priority Data
Nov. 5, 2002    (DE) ................ 102 51 363

(51) Int. Cl.
*F01N 3/00* (2006.01)
(52) U.S. Cl. .................. 60/289; 60/274; 60/280; 60/290; 60/307
(58) Field of Classification Search ........... 60/274, 60/277, 280, 289, 290, 293, 307, 396, 397
See application file for complete search history.

(56) References Cited

U.S. PATENT DOCUMENTS

| | | | | |
|---|---|---|---|---|
| 3,299,629 | A | * | 1/1967 | Bouchard ............... 60/305 |
| 4,702,219 | A | * | 10/1987 | Tadokoro et al. ........ 123/559.1 |
| 5,542,292 | A | | 8/1996 | Schneider et al. |
| 5,560,199 | A | * | 10/1996 | Agustin et al. ............... 60/274 |
| 5,832,725 | A | * | 11/1998 | Sim ............................ 60/289 |
| 5,921,077 | A | * | 7/1999 | Bayerle et al. ............... 60/274 |
| 6,094,909 | A | | 8/2000 | Weber et al. |
| 6,131,447 | A | * | 10/2000 | Oeller ....................... 73/118.1 |
| 6,334,436 | B1 | * | 1/2002 | Paffrath et al. ............. 123/563 |
| 6,497,094 | B1 | * | 12/2002 | Tuleweit et al. ............. 60/289 |
| 6,817,173 | B1 | | 11/2004 | Paffrath et al. |
| 2004/0159312 | A1 | | 8/2004 | Hummel |

FOREIGN PATENT DOCUMENTS

DE    41 20 891    1/1993

\* cited by examiner

*Primary Examiner*—Thomas Denion
*Assistant Examiner*—Diem Tran
(74) *Attorney, Agent, or Firm*—Walter Ottesen

(57) ABSTRACT

The invention relates to a method and an arrangement for controlling a drive unit (1), especially of a vehicle, having a combustion engine (5). The method and arrangement make possible a correct charge control when utilizing a secondary air charger (10) as well as make possible a diagnosis of the secondary air charger (10). Secondary air is blown into an exhaust-gas system (15) of the combustion engine (5) via the secondary air charger (10). The secondary air charger (10) is driven by a pressure drop across an actuating element (20) for adjusting an air supply to the engine (5). The actuating element (20) is driven for adjusting an air supply to the engine (5) corrected in dependence upon an air mass flow driving a turbine (25) of the secondary air charger (10).

9 Claims, 2 Drawing Sheets

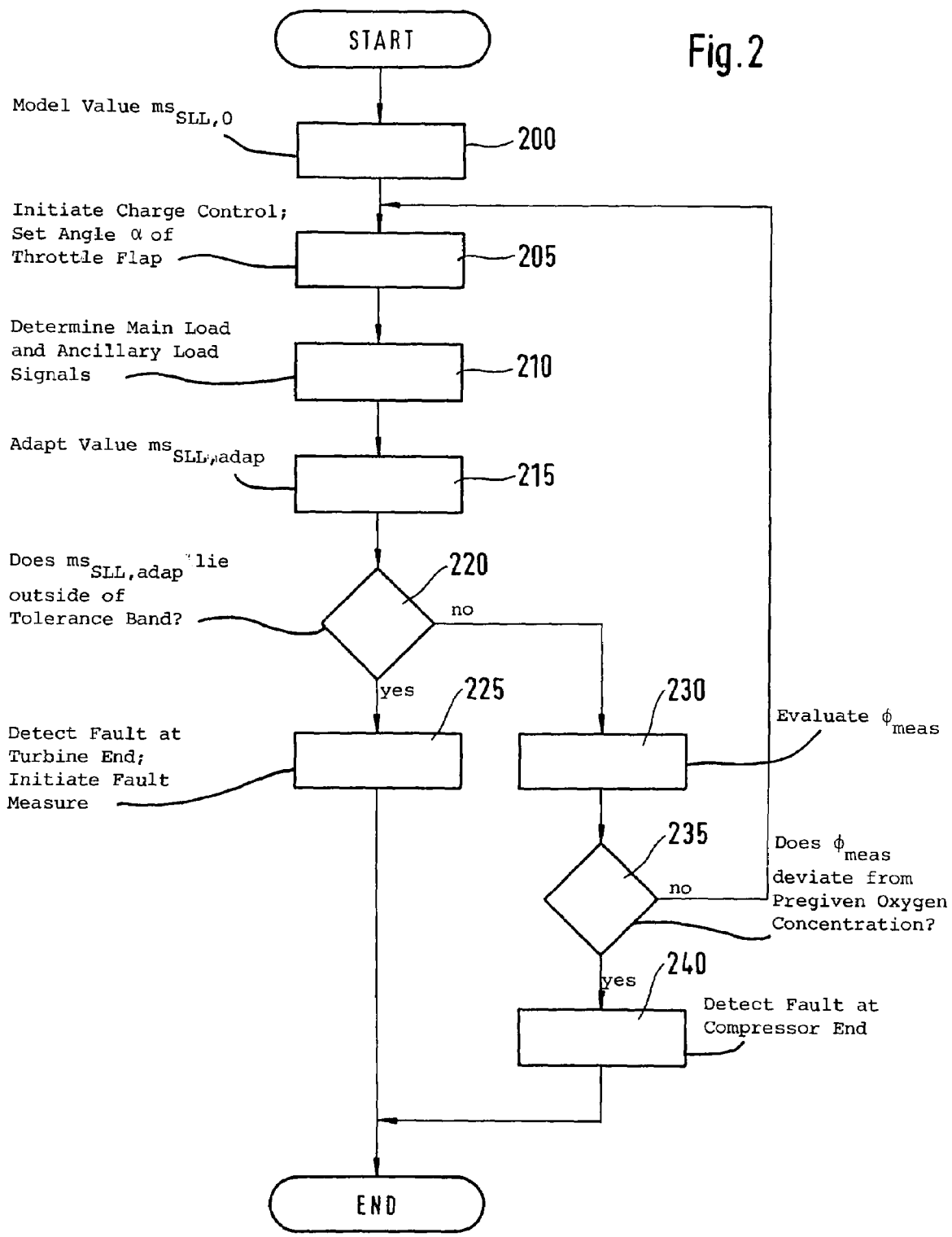

METHOD AND ARRANGEMENT FOR CONTROLLING A DRIVE UNIT HAVING AN INTERNAL COMBUSTION ENGINE

BACKGROUND OF THE INVENTION

A catalytic converter exhaust-gas after treatment is required in order that the toxic substance emissions in the form of hydrocarbons, carbon monoxide and nitrogen oxide remain below the statutory limit values therefor during operation of motor vehicles. The catalytic converter reduces the active energy for the chemical reaction which converts the toxic substances into harmless end products such as water, carbon dioxide and nitrogen. An effective exhaust-gas after treatment still requires catalytic converter temperatures of at least a so-called light-off temperature of 250° to 300° C. The objective of the exhaust-gas optimization is therefore to bring the catalytic converter as rapidly as possible to the light-off temperature and to emit as little toxic substances as possible because here there is still no after treatment possible. The exhaust gas of the motoric combustion functions as a heat source for the catalytic converter and the catalytic converter is additionally heated up for this purpose via a targeted deterioration of the degree of efficiency of the internal combustion engine. If this is not sufficient for reaching the desired exhaust-gas standard, then additional heating measures are required utilizing external components.

A proven method provides for blowing in fresh air into the exhaust-gas system which is characterized hereinafter as secondary air. The secondary air reacts exothermally with the excessive fuel from the motoric combustion starting from an ignition temperature of approximately 600° C. The advantages of this after combustion are, on the one hand, a clear increase of the exhaust-gas temperature which is needed for the warming of the catalytic converter to operating temperature and, on the other hand, for a reduction of the hydrocarbon emissions because of the combustion process.

The secondary air blow-in is only active until the catalytic converter has reached its operating temperature. For diagnostic purposes, the secondary air blow-in is then activated once more for a short time during the driving cycle.

For the in-blow of secondary air, an electric secondary air pump was used up to now. In this way, the further influence of the secondary air blow-in on the engine control is essentially limited to a correction of the control of the air/fuel mixture ratio and an increase of the torque reserve because of the additional generator load required by activating the electric pump. This method of rapid catalytic converter heating is achieved with a current consumption by the secondary air pump of up to 80 A during run-up and approximately 32 A in continuous operation as well as a weight of approximately 2.5 kg and a volume of approximately 3 liters.

A so-called secondary air charger is known from the publication entitled "Secondary Air Charger-high integrated secondary air system for intake manifolds" by K. Hummel and S. Wild, SAE paper 2001-01-0665. This secondary air charger utilizes the pressure drop across the throttle flap in the air supply to the internal combustion engine in order to drive a turbine. The turbine is coupled by a shaft to a compressor for compressing the secondary air which is blown into the exhaust-gas system in a conventional manner. The advantages of such a secondary air charger are the following: the absence of a need for electric drive energy; a relatively low weight of approximately 0.5 kg at the present time; and, a comparatively low volume of approximately 1 liter at the present time. The secondary air charger is controlled via a valve which releases the air mass flow for the drive of the secondary air charger.

SUMMARY OF THE INVENTION

The method of the invention and arrangement of the invention for controlling a drive unit having an internal combustion engine afford the advantage compared to the above that the actuating element is driven for adjusting the air supply to the engine which is corrected in dependence upon an air mass flow driving a turbine of a secondary air charger. In this way, the operation of the secondary air charger can be considered also for the air supply to the engine with the charge control in addition to the known exhaust-gas end influences of the secondary air blowing-in on the engine control. In this way, it can be ensured that, with the use of the secondary air charger, the air mass, which is supplied to the engine, is correctly adjusted.

It is especially advantageous when the actuating element is so driven that the air mass flow, which is to be supplied via the actuating element to the engine, corresponds to the total air mass flow, which is to be supplied to the engine, less the air mass flow via the turbine of the secondary air charger. In this way, the position of the actuating element for a correct air supply to the engine can be determined and adjusted in an especially simple manner.

A further advantage results when a value for the air mass flow via the turbine of the secondary air charger is adapted by a comparison of a measured air supply to the engine to a modeled air supply to the engine. In this way, it is ensured that the value of the air mass flow via the turbine of the secondary air charger is adapted during the total vehicle service life and can therefore be determined correctly.

It is further advantageous when the air supply to the engine is modeled in dependence upon the engine rpm and the position of the actuating element while considering the air mass flow through the turbine of the secondary air charger. In this way, the air supply to the engine can be modeled as accurately as possible. The air supply to the engine modeled in this way can, via a comparison to the measured air supply to the engine, be used for an especially precise adaptation of the value for the air mass flow via the turbine of the secondary air charger. This is so especially when the modeled air supply to the engine was adapted to the measured air supply to the engine in dependence upon the engine rpm and the position of the actuating element without operation of the secondary air charger.

It is especially advantageous when a defective function of the secondary air charger is detected when the adapted air mass flow through the turbine of the secondary air charger lies outside of a pregiven tolerance band. In this way, a fault on the turbine end of the secondary air charger can be detected especially easily without an additional sensor system or additional measuring operations being necessary.

A further advantage results when the pregiven tolerance band is so selected that it includes a modeled value for the air mass flow through the turbine of the secondary air charger. In this way, the pregiven tolerance band can represent a problem free operation of the secondary air charger on the turbine end.

A further advantage results when a defective function of the secondary air charger is detected when a measured oxygen concentration in the exhaust-gas system deviates in magnitude by more than a pregiven threshold from a pregiven oxygen concentration. In this way, a diagnosis of the secondary air charger is possible on the compressor end and therefore on the exhaust-gas end in an especially simple manner.

The same applies when a defective operation of the secondary air charger is detected when a measured air/fuel mixture ratio in the exhaust-gas system deviates in magnitude by more than a pregiven threshold from a pregiven value.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
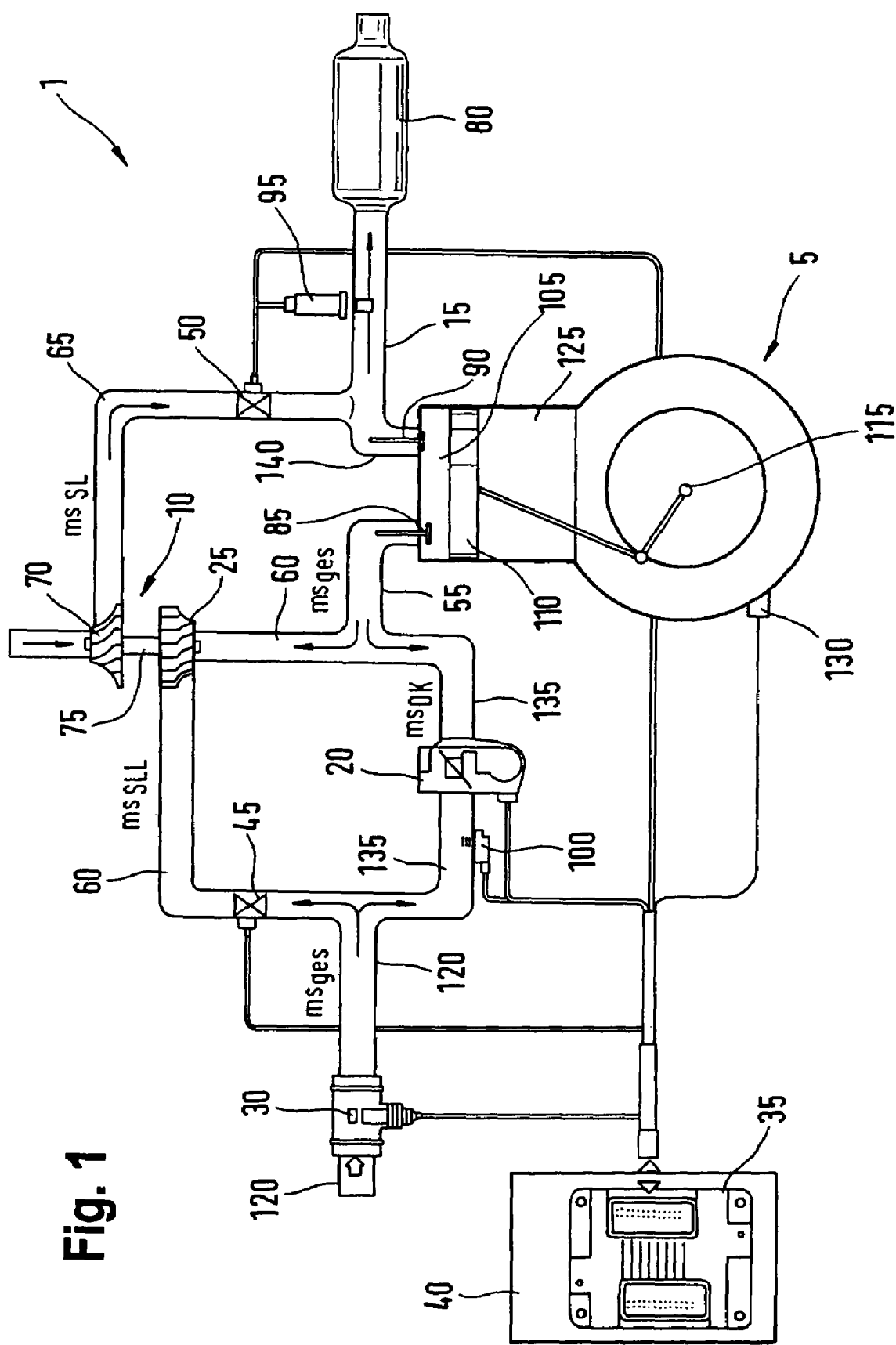
FIG. 1 is a block diagram of a drive unit having an internal combustion engine and an arrangement according to the invention; and, FIG. 2 is a flowchart for explaining an exemplary sequence of the method of the invention.

In FIG. 1, reference numeral 1 identifies a drive unit. The drive unit can, for example, be a drive unit of a motor vehicle. The drive unit includes an internal combustion engine 5 which can, for example, be configured as a spark-ignition engine. The internal combustion engine 5 of FIG. 1 includes at least a cylinder 125 having a piston 110 which drives a crankshaft 115 via an up and down movement in the cylinder 125. The cylinder 125, which is shown by way of example in FIG. 1, further includes a combustion chamber 105 for combusting an air/fuel mixture whereby the piston 110 is driven in a manner known per se. Air from an intake manifold 55 is supplied to the combustion chamber 105 via an inlet valve 85. The air mass flow, which is supplied to the combustion chamber 105 via the intake manifold 55 and the inlet valve 85, is identified by $ms_{ges}$. The exhaust gas, which is formed by the combustion in the combustion chamber 105, is supplied via an outlet valve 90 to the exhaust-gas system 15 wherein a lambda probe 95 is mounted. The lambda probe 95 measures the air/fuel mixture ratio in the exhaust-gas system 15, for example, by measuring the oxygen concentration therein. The lambda probe 95 in the exhaust-gas system 15 is mounted upstream of a catalytic converter 80 viewed in flow direction. The catalytic converter 80 reduces the discharge of toxic substances in a manner known per se. The air mass flow $ms_{ges}$, which is supplied to the combustion chamber 105, is referred to hereinafter as the total air mass flow and is first supplied to the engine 5 via an air feed line 120 in which an air-mass sensor 30 is mounted for measuring the total air mass flow $ms_{ges}$. The air-mass flow sensor 30 can, for example, be a hot-film air-mass sensor. The measured value for the total air mass flow $ms_{ges}$ is transmitted from the air-mass sensor 30 to an arrangement 40 which, for example, is integrated into an engine control or which itself can define an engine control. The air feed line 120 divides downstream of the air-mass sensor 30 in flow direction, on the one hand, into a first air branch 135 and, on the other hand, into a second air branch 60.

In the first air branch 135, an actuating element 20 is mounted and is, for example, in the form of a throttle flap. The position or the opening angle of the throttle flap is controlled by control means 35 of the arrangement 40. The pressure in the first air branch 135 in flow direction ahead of the throttle flap 20 is measured by a charge pressure sensor 100 and is transmitted to the control means 35. The charge pressure sensor 100 is necessary only for turbo systems. In induction engines, ambient pressure is present ahead of the throttle flap 20. The air mass flow through the throttle flap 20 in the first branch 135 is identified in FIG. 1 by $ms_{DK}$. The second air branch 60 includes first a secondary air charger valve 45 whose degree of opening is likewise driven by the control means 35. In this way, the air mass flow through the second air branch 60 can also be controlled. This is identified in FIG. 1 by $ms_{SLL}$. A turbine 25 is mounted in the second air branch 60 downstream of the secondary air charger 45 in flow direction. The turbine 25 is driven by the air mass flow $ms_{SLL}$. The intake manifold 55 again joins the first air branch 135 in flow direction after the throttle flap 20 and the second air branch 60 in flow direction after the turbine 25. In this way, the air mass flow in the intake manifold 55 corresponds to the air mass flow in the air feed line 120 and therefore corresponds to the total air mass flow $ms_{ges}$. The turbine 25 drives a compressor 70 in a secondary air line 65 via a shaft 75. A secondary air pump valve 50 is mounted in the secondary air line 65 downstream of the compressor 70. The degree of opening of the secondary air pump valve 50 is controlled likewise by the control means 35. A secondary air mass flow $ms_{SL}$ is supplied to the exhaust-gas system 15 via the secondary air line 65.

Furthermore, an rpm sensor 130 is mounted at the internal combustion engine 5 and measures the engine rpm of the engine 5 and transmits the same to the control means 35.

For an opened secondary air charge valve 45, a part of the total air mass flow $ms_{ges}$ flows into the second air branch 60 and there results in the air mass flow $ms_{SLL}$ which drives the turbine 25. The compressor 70 is driven via the shaft 75 and compresses the secondary air mass flow $ms_{SL}$ in the secondary air line 65. The secondary air mass flow $ms_{SL}$ is supplied to the exhaust-gas system 15 when the secondary air pump valve 50 is open and makes possible an after combustion of uncombusted fuel residue in the exhaust-gas system 15 for heating up the catalytic converter 80. The supply of the secondary air mass flow $ms_{SL}$ into the exhaust-gas system 15 is therefore an advantage primarily after engine start so long as the catalytic converter 80 has not reached its operating temperature. In this way, the operating temperature of the catalytic converter 80 can be reached more rapidly. As soon as the catalytic converter 80 has reached its operating temperature, the supply of secondary air via the secondary air line 65 can be ended. A temperature sensor in the region of the catalytic converter 80 can be provided for detecting the catalytic converter temperature and this temperature sensor is connected to the control means 35 which, however, is not shown in FIG. 1 for the sake of clarity. The termination of the secondary air supply can be achieved by closing the secondary air charge valve 45 and/or the secondary air pump valve 50.

The turbine 25, shaft 75 and the compressor 70 conjointly define a secondary air charger 10.

In the following, the fresh air charge of the at least one cylinder 125 of the internal combustion engine 5 is characterized hereinafter with the term "charge". The charge defines the air mass which is disposed in the combustion chamber 105 of the cylinder 125 after the closing of the inlet valve 85. The object of the so-called charge detection is to determine the actual value of this air mass as accurately as possible. Only in this way can, for example, a pregiven stoichiometric air/fuel mixture ratio λ (for example, λ=1) be adjusted at all operating points of the engine 5. This stoichiometric air/fuel mixture ratio is required for the exhaust-gas after treatment by means of the catalytic converter 80 which, for example, can be configured as a three-way catalytic converter.

For example, two paths are available to the engine control 40 for determining the charge.

As a primary signal, the total air mass flow $ms_{ges}$, which was obtained by means of the air-mass sensor 30, is available. Alternatively, the total air mass flow $ms_{ges}$ can be determined by means of a pressure sensor (not shown in FIG. 1) in the intake manifold 55 while using a combustion chamber temperature model in a manner known per se for forming the primary signal. The total air mass flow $ms_{ges}$ is directly proportional to the charge for steady state operating points. Transient conditions require a consideration of the intake manifold dynamic for detecting the total air mass flow $ms_{ges}$ and are described with the aid of an intake manifold model likewise in a manner known per se.

The total air mass flow $ms_{ges}$ can be computed as an ancillary signal from the engine rpm (n), which is measured by means of the rpm sensor 130, and the opening angle a of the throttle flap 20 in accordance with the so-called α-n model likewise known per se. Because of component tolerances, however, this method is significantly less accurate than the direct measurement of the total air mass flow $ms_{ges}$ by the air-mass sensor 30. For this reason, a comparison of the α-n model to the primary signal, which is measured via the air-mass sensor 30, takes place in conventional engine control programs.

As long as the air-mass sensor 30 is operationally ready, the charge detection of the engine control 40 utilizes the primary signal. With a malfunction of the air-mass sensor 30 or other disturbing operating conditions, for example, a negative load gradient in the case of turbo engines (wherein the pressure drop in the intake manifold 55 influences the air-mass sensor 30 via overrun recirculation valves), the ancillary signal is applied for the computation of the charge.

It is the object of the charge control (for example, via an accelerator pedal angle) to compute the corresponding opening angle of the throttle flap 20 from a torque model via the pregiven desired value for the charge. This is quasi an inversion of the α-n model for charge detection. Together with a feedback to the charge detection, a control loop is built up in conventional engine control programs which adapts the air quantity in the combustion chamber 105 of the cylinder 125 to the particular desired operating point.

During the operation of the secondary air charger 10, the charge control is first corrected. A desired value $ms_{ges,des}$ for the total mass flow for a closed secondary air charge valve 45 is given by the following equation via a desired value $ms_{DK,des}$ for the mass flow via the throttle flap 20:

$$ms_{ges,des} = ms_{DK,des} \quad (1)$$

For a switched-in secondary air charger 10 and an opened secondary air charge valve 45, the total air mass flow $ms_{ges}$ has to be corrected, in addition to the adjustable air mass flow $ms_{DK}$ via the throttle flap 20, additionally by the air mass flow $ms_{SLL}$ in the second air branch 60 so that, in this case, the following applies:

$$ms_{ges} = ms_{DK} + ms_{SLL} \quad (2)$$

For the computation of the opening angle of the throttle flap 20 for realizing the desired value $ms_{ges,des}$ for the total air mass flow for an open secondary charge valve 45 and therefore during the operation of the secondary air charger 10, the desired value $ms_{DK,des}$ for the air mass flow via the throttle flap 20 has to be computed as follows:

$$ms_{DK,des} = ms_{ges,des} - ms_{SLL} \quad (3)$$

In the extreme case, this has the consequence that the throttle flap 20 remains closed when the desired value $ms_{ges,des}$ for the entire air mass flow corresponds to the air mass flow $ms_{SLL}$ through the second air branch 60 and the total air mass flow flows only via the second air branch 60 and not via the first air branch 135. For the case that the degree of opening of the secondary air charge valve 45 is not variable and the secondary air charge valve 45 is therefore only completely closed or only completely opened, the idle rpm would have to be changed as required in order to at least reach the lower limit of the desired value $ms_{ges,des} = ms_{SLL}$.

The air mass flow $ms_{SLL}$ in the second air branch 60 can be computed by a model in the engine control program or can be measured directly by means of a further air-mass sensor (not shown in FIG. 1), for example, a hot-film air-mass sensor in the second air branch 60. In the case of the modeling of the air mass flow $ms_{SLL}$ in the second air branch 60, the pressures forward and after the throttle flap 20 are applied in the simplest case because the pressure drop across the throttle flap 20 functions as a drive source of the turbine 25 of the secondary air charger 10. The pressure in the flow direction ahead of the throttle flap can be measured with the aid of the charge pressure sensor 100 or can be measured for the intake system with an ambient pressure sensor (not shown). The pressure in flow direction after the throttle flap 20 can be measured in the intake manifold 55 by a pressure sensor (not shown in FIG. 1). Furthermore, for the modeling of the air mass flow $ms_{SLL}$ in the second air branch 60, the exhaust-gas counterpressure must also be considered against which the compressor 70 of the secondary air charger 10 operates. This exhaust-gas counterpressure can be determined by a pressure sensor (not shown) in the exhaust-gas system 15 or can be defined by a model as a function of the exhaust-gas mass flow. The model for determining the air mass flow $ms_{SLL}$ in the second air branch 60 can be formed empirically, for example, on a test stand with the aid of characteristic lines or characteristic fields in dependence upon the above-mentioned pressures before and after the throttle flap 20 as well as the exhaust-gas counterpressure. However, models can also be used which compute via a time-dependent integration the rpm of the turbine 25 or of the compressor 70 of the secondary air charger 10 in dependence upon the drive torque of the turbine 25 described in a first approximation via the pressure ratio across the throttle flap and the lost torque determined in a first approximation via the exhaust-gas counterpressure and the turbine friction and the pregiven or measured mass inertia torque of the turbine 25 or use the values from, for example, an optimized rpm detection. By means of a turbine characteristic field of the secondary air charger 10 (which is adapted empirically, for example, to a test band), the mass flow $ms_{SLL}$ of the second air branch can be determined in dependence upon the turbine rpm. The secondary air mass flow $ms_{SL}$ can be determined by means of a compressor characteristic field of the secondary air charger 10 from the rpm of the compressor 70. The compressor characteristic field is empirically adapted likewise, for example, on a test stand.

In the example of FIG. 1, the rpm of the turbine 25 and of the compressor 70 are equal because of the connection via the shaft 75.

A defective modeling of the mass flow $ms_{SLL}$ in the second air branch 60 and therefore via the turbine 25 can be detected in the charge detection from the comparison of primary and ancillary signals and can be corrected. This correction has as a condition precedent that, already during operation of the engine 5 with the secondary air charge valve 45 closed, an adaptation between the primary and ancillary signals has taken place, that is, both signals can be assumed to be correct for the duration of the operation of the secondary air charger 10. In the charge detection, the following applies in the case of the primary signal during operation of the secondary air charger 10:

$$ms_{ges,act} = ms_{LMM} \quad (4)$$

and, in the case of the ancillary signal:

$$ms_{ges,act} = ms_{\alpha-n} + ms_{SLL} \quad (5)$$

wherein $ms_{LMM}$ is the air mass flow determined by air-mass sensor 30 which corresponds to the actual value $ms_{ges,act}$ for the total air mass flow in accordance with equation (4) and which is also identified as $ms_{HFM}$ when utilizing a hot-film air-mass sensor which is assumed in the following by way of example. The air mass flow $ms_{\alpha-n}$ is the actual value for the air mass flow $ms_{DK}$ through the throttle flap 20 and this actual value is computed based on the α-n model. The operation of the secondary air charger 10 is already considered in the charge control so that a correspondingly smaller opening angle α of the throttle flap 20 forms the basis for the air mass flow $ms_{\alpha-n}$ for the detection of the actual value for the air mass flow $ms_{DK}$ through the throttle flap 20 than for an operation of the internal combustion engine 5 without a secondary air charger 10 or for a closed secondary air charge valve 45. A relative deviation Δ of the modeled ancillary signal from the measured primary signal is defined by the measured primary signal and this deviation is given by:

$$\Delta = 1 - \frac{ms_{\alpha-n} + ms_{SLL}}{ms_{HFM}} \quad (6)$$

wherein a positive value for the relative deviation Δ indicates a mass flow $ms_{SLL}$ in the second air branch 60 which is too small; whereas, a negative value for the relative deviation Δ results for an air mass flow $ms_{SLL}$ in the second air branch 60 which is too great.

For an asymptotic correction of a defective air mass flow $ms_{SLL}$ through the second air branch 60 at a steady state operating point of the internal combustion engine 5, the following dynamic is suggested:

$$\frac{d}{dt}\left(\frac{ms_{SLL,adap}}{ms_{SLL,0}}\right) = \frac{\Delta}{T_0} \cdot \frac{ms_{SLL,adap}}{ms_{SLL,0}} \quad (7)$$

$$= \frac{ms_{SLL,adap}}{T_0 \cdot ms_{SLL,0}} \cdot \left(1 - \frac{ms_{\alpha-n} + ms_{SLL,adap}}{ms_{HFM}}\right)$$

The time constant $T_0$ is an index for the adaptation speed and can be suitably inputted. The time constant $T_0$ should assume values which are greater than the duration of typical operating state changes, that is, for example, $T_0 \sim 5$ to 10 seconds. In this way, the adaptation can be carried out also during a transient operation of the combustion engine 5. Furthermore, it is noted that the differential equation (7) is of the type of the so-called "logistic equation" which, for time-discrete evaluation as is the case, for example, also in engine control 40, tends to chaotic conditions in the event that the prefactor $1/T_0$ assumes a value which is too great. The time constant $T_0$ may therefore also not be selected too small in order to avoid such chaotic behavior. The value $ms_{SLL,0}$ defines the air mass flow (which was modeled as described above) in the second air branch 60 through the turbine 25 without adaptation and defines, simultaneously, also the start condition of the differential equation. In contrast, the value $ms_{SLL,adap}$ defines the adapted air mass flow in the second air branch 60 through the turbine 25.

For the adapted air mass flow $ms_{SLL,adap}$ in the second air branch 60, the following time-dependent course results from the equation (7) with the start condition $ms_{SLL,adap}(0) = ms_{SLL,0}$:

$$ms_{SLL,adap}(t) = \frac{ms_{HFM} - ms_{\alpha-n}}{1 + \frac{ms_{HFM} - ms_{\alpha-n} - ms_{SLL,0}}{ms_{SLL,0}} \cdot e^{-\frac{ms_{HFM} - ms_{\alpha-n}}{ms_{HFM}} \cdot \frac{t}{T_0}}} \quad (8)$$

The adapted mass flow $ms_{SLL,adap}$ in the second air branch 60 approaches therefore exponentially the difference of the actual value $ms_{ges,act}$ for the total air mass flow (which was measured in the hot-film air-mass sensor 30) and the mass flow $ms_{\alpha-n}$ for the actual value of the air mass flow $ms_{DK}$ through the throttle flap 20 from the α-n model. The α-n model is adapted already for a closed secondary air charge valve 45 or during operation without the secondary air charger 10 with the primary signal. For this reason, the actual mass flow through the turbine 25 in the second air branch 60 results from the solution of equation (7). The operation of the secondary air charger 10 takes place, as a rule, directly after the engine start so that the adaptation between primary and ancillary signals of the charge detection must originate from the previous driving cycle. The adaptation values therefore have to be accommodated in a memory region of the engine control 40 continuously supplied with current.

The engine control 40 or the control means 35 can undertake an adaptation of the mass flow $ms_{SLL}$ in the second air branch 60 based on the primary and negative signals of the charge detection in that the engine control or control means integrates the equation (7). The determination of the ancillary signal in accordance with equation (5) and the relative deviation Δ according to equation (6) takes place in the case of the adapted air mass flow $ms_{SLL,adap}$ by correspondingly inserting this value for the value $ms_{SLL}$ in the above-mentioned equations. In the case of the modeled, non-adapted air mass flow $ms_{SLL,0}$, the determination of the ancillary signal and the relative deviation Δ takes place in accordance with equations (5) and (6) via correspondingly inserting this value for the value $ms_{SLL}$.

For the diagnosis of the operation with the secondary air charger 10, the measured oxygen concentration in the exhaust-gas system 15 from the lambda probe 95 is available in addition to the adapted air mass flow $ms_{SLL,adap}$. The measured oxygen concentration can, however, only be evaluated when the lambda probe 95 has reached its operational readiness. Depending upon reaching the operational readiness of the lambda probe 95, a diagnosis of the secondary air charger 10 therefore either takes place still in the operation close to start or takes place at a later suitable time point in the driving cycle, as required, via a second switching-in of the secondary air charger 10 and a corresponding opening of the secondary air charge valve 45. The operational readiness of the lambda probe 95 is dependent upon the temperature reached in the exhaust-gas system 15. If the required operating temperature for the operational readiness of the lambda probe 95 is reached in the operation of the secondary air charger 10 close to start, then the diagnosis of the secondary air charger 10 can take place in the start-near operation with the aid of the lambda probe 95. Otherwise, the diagnosis of the secondary air charger 10 by the lambda probe 95 takes place at a later suitable time point in the driving cycle when, in the exhaust-gas system 15, the operating temperature was reached which is required for the operational readiness of the lambda probe 95.

The adaptation value of the mass flow $ms_{SLL,adap}$ through the turbine 25 of the secondary air charger 10 is obtained from the integration of the equation (7) initially starting from the modeled, non-adapted mass flow $ms_{SLL,0}$. For a properly operating secondary air charger 10, the adaptation value of the air mass flow $ms_{SLL,adap}$ then lies within a pregiven tolerance band about the modeled, non-adapted air mass flow $ms_{SLL,0}$.

If the adaptation value $ms_{SLL,adap}$ of the air mass flow through the turbine 25 lies outside of this tolerance band, then a defective function of the secondary air charger 10 is detected and a suitable fault measure is initiated which could lead to the switch-off of the secondary air charger 10 as a final consequence or lead to a closing of the secondary air charge valve 45.

Furthermore, a leaning of the air/fuel ratio λ in the exhaust-gas system 15 because of the secondary air blow-in is determined by the lambda probe 95.

The lambda probe 95 measures the oxygen concentration $\phi_{meas}$ in the exhaust-gas train 15. The engine control 40 or the control means 35 can compute the secondary air mass flow $ms_{SL}$ from the measured oxygen concentration $\phi_{meas}$ in the exhaust-gas system 15 and an exhaust-gas mass flow when it is known which desired value $\lambda_{des}$ was to be adjusted for the air/fuel mixture ratio in the combustion chamber 105 of the cylinder 125 ahead of the combustion. For measuring the exhaust-gas mass flow, a suitable mass flow sensor (not shown in FIG. 1) can be provided in the exhaust-gas system 15.

The exhaust-gas system 15 joins, on the one hand, the secondary air line 65 and, on the other hand, the exhaust gas which is discharged from the combustion chamber 105 of the cylinder 125 via an outlet valve 90 and an exhaust-gas line 140.

The measured oxygen concentration $\phi_{meas}$ in the exhaust-gas system 15 results as follows:

$$\phi_{meas} = \frac{ms_{SL} \cdot \phi_{air} + ms_{ex-gas} \cdot \phi_{ex-gas}}{ms_{SL} + ms_{ex-gas}} \quad (9)$$

wherein $\phi_{air}$=21% and $\phi_{ex-gas}$~0%.

Wherein: $\phi_{air}$ is the oxygen concentration in the secondary air supplied via the secondary air line 65; $\phi_{ex-gas}$ is the oxygen concentration in the exhaust gas which results only on the basis of the desired value $\lambda_{des}$ for the air/fuel mixture ratio to be realized in the combustion chamber 105 of the cylinder 125.

The relationship between the oxygen concentration $\phi$ and the corresponding air/fuel mixture ratio is known from the literature. The measured oxygen concentration $\phi_{meas}$ is determined, as described, by the lambda probe 95 in flow direction ahead of the catalytic converter 80. The oxygen concentration in the exhaust gas $\phi_{ex-gas}$ can likewise be determined from the allocation ratio, which is known from the literature, from the desired value $\lambda_{des}$ for the air/fuel mixture ratio in the combustion chamber 105 of the cylinder 125 ahead of the combustion. The equation (9) is then solved in accordance with the secondary air mass flow $ms_{SL}$ and stored in the engine control 40 or in the control means 35.

If the air throughput in the second air branch 60 or in the secondary air line 65 has changed, for example, because of deterioration effects or external interventions (for example, because of the loosening of an air hose), then this is shown in a change of the adaptation value $ms_{SLL,adap}$ as well as in the measured oxygen concentration $\phi_{meas}$ in the exhaust-gas system 15. A defective function of the secondary air charger 10 can even be detected when the measured oxygen concentration $\phi_{meas}$ in the exhaust-gas system 15 deviates in magnitude by more than a first pregiven threshold from a pregiven oxygen concentration.

Correspondingly, a defective function of the secondary air charger 10 can be detected when an air/fuel mixture in the exhaust-gas system 15 deviates, in magnitude, by more than a second pregiven threshold from a pregiven air/fuel mixture ratio value which, for example, can correspond to the desired value $\lambda_{des}$ plus an offset value for the expected leaning of the air/fuel mixture ratio by the secondary air blow-in. The above-mentioned air/fuel mixture ratio in the exhaust-gas system 15 is assigned to the measured oxygen concentration $\phi_{meas}$ and therefore is likewise measured.

Additionally, the operability of the secondary air charge valve 45 or of the secondary air pump valve 50 can be checked via a conventional end stage diagnosis.

For a fault on the compressor end of the secondary air charger 10, only a slight or no deviation of the measured oxygen concentration $\phi_{meas}$ in the exhaust-gas system 15 from the oxygen concentration can be shown which results because of the realization of the desired value $\lambda_{des}$ for the air/fuel mixture ratio in the combustion chamber 105 of the cylinder 125. In this way, the measured oxygen concentration $\phi_{meas}$ deviates from the pregiven oxygen concentration by more than the first pregiven threshold insofar that a value was selected for the pregiven oxygen concentration which results from the oxygen concentration $\phi_{ex-gas}$ plus an adequately large offset value for the consideration of the secondary air blow-in. In this case, the fault on the compressor end of the secondary air charger 10 can be detected and a suitable fault measure can be initiated. In contrast, the adaptation value $ms_{SLL,adap}$ for the air mass flow at the turbine end of the secondary air charger 10 in the second air branch 60 lies within the tolerance band when the fault lies exclusively at the compressor end of the secondary air charger 10.

In contrast, for a fault at the turbine end of the secondary air charger 10, the adaptation value $ms_{SLL,adap}$ for the air mass flow in the second air branch 60 leaves its tolerance band. In this way, the fault at the turbine end of the secondary air charger 10 is detected and a required fault measure can be initiated. Furthermore, for a fault occurring at the turbine end of the secondary air charger 10, the measured oxygen concentration $\phi_{meas}$ likewise does not deviate or deviates only slightly from the oxygen concentration $\phi_{ex-gas}$ because the drive energy of the secondary air charger 10 is not present and therefore no secondary air can be blown into the exhaust-gas system 15. In this way, a fault is detected also via the measured oxygen concentration $\phi_{meas}$ in the case of a fault at the turbine end of the secondary air charger 10. Corresponding to the fault detection based on the measured oxygen concentration, the measured air/fuel mixture ratio in the exhaust-gas system 15 can be applied for fault detection as described.

For this, attention must be paid in the selection of the first pregiven threshold that, in the case of only a slight or no deviation of the measured oxygen concentration $\phi_{meas}$ from the oxygen concentration $\phi_{ex-gas}$, the measured oxygen concentration $\phi_{meas}$ deviates by more than the first pregiven threshold from the pregiven oxygen concentration. Attention is to be paid in the same way to the selection of the second pregiven threshold so that a measured air/fuel mixture ratio, which deviates only slightly or not at all from the desired value $\lambda_{des}$, deviates by more than the second pregiven threshold from the pregiven air/fuel mixture ratio.

A fault at the compressor end of the secondary air charger 10 can comprise that the secondary air pump valve 50 clamps and is faultily closed so that, in an unwanted manner, there is no secondary air blow-in into the exhaust-gas system 15. A fault at the turbine end of the secondary air charger 10 can comprise that the secondary air charge valve 45 is stuck and is closed in an unwanted manner so that there is neither an air mass flow $ms_{SLL}$ through the second air branch 60 nor a secondary air blow-in into the exhaust-gas system 15.

Furthermore, a fault at the turbine end of the secondary air charger 10 can result in such a manner that the air mass flow $ms_{SLL}$ in the second air branch 60 changes in such a manner that the adaptation value $ms_{SLL,adap}$ lies outside of the tolerance band but the turbine 25 of the secondary air charger 10 is nonetheless driven and there is thereby a secondary air blow-in into the exhaust-gas system 15 so that the fault can be only detected based on the adaptation value $ms_{SLL,adap}$ and not via the measured oxygen concentration $\phi_{meas}$. If a fault lies neither at the turbine end nor at the compressor end of the secondary air charger 10, then the adaptation value $ms_{SLL,adap}$ lies within the pregiven tolerance band and the secondary air blow-in into the exhaust-gas system 15 leads to a measured oxygen concentration $\phi_{meas}$ in the exhaust-gas system 15 which corresponds approximately to the pregiven oxygen concentration so that no fault is detected.

In the sequence plan of FIG. 2, a sequence of the method of the invention is provided by way of example. After the start of the program, for example, after the first start of the combustion engine 5, the control means 35 models the value $ms_{SLL,0}$ for the air mass flow in the second air branch 60 in the manner described. Thereafter, the program branches to program point 205.

At program point 205, the control means 35 causes a charge control in the manner described while considering the air mass flow in the second air branch 60 and adjusts the opening angle a of the throttle flap 20 to the required value.

Thereafter, the program branches to program point 210.

At program point 210, the control means 35 determines the main load signal and the ancillary load signal in the context of the charge detection. Thereafter, the program branches to program point 215.

At program point 215, the control means 35 adapts the value $ms_{SLL,adap}$ in accordance with equation (7) in the manner described on the basis of the charge detection and the determined relative deviation Δ. Thereafter, the program branches to program point 220.

At program point 220, the control means 35 checks whether the adapted value $ms_{SLL,adap}$ lies outside of the tolerance band. If this is the case, then the program branches to program point 225, otherwise, the program branches to program point 230.

At program point 225, a fault is detected at the turbine end of the secondary air charger 10 and a suitable fault measure is initiated, which, as a final consequence, can lead to a switch-off of secondary air charger 10 or to a blocking of the secondary air charge valve 45. Thereafter, there is a movement out of the program.

At program point 230, the control means 35 evaluates the measured oxygen concentrations $\phi_{meas}$ of the lambda probe 95. Thereafter, the program branches to program point 235.

At program point 235, the control means 35 checks whether the measured oxygen concentration $\phi_{meas}$ deviates from the pregiven oxygen concentration by more than a first pregiven threshold. If this is the case, then the program branches to program point 240, otherwise, the program branches back to program point 205.

At program point 240, the control means 35, in turn, detects (as at program point 225) a fault, which, however, lies this time at the compressor end of the secondary air charger 10. The control means 35 initiates a suitable fault measure which, if required, can take place up to switching off the secondary air charger 10, for example, by blocking the secondary air charge valve 45 and/or the secondary air pump valve 50. Thereafter, there is a movement out of the program.

The determination of the ancillary signal at program point 210 takes place with the very first runthrough of the program of FIG. 2 on the basis of the modeled, non-adapted air mass value $ms_{SLL,0}$ and with all further runthroughs of the program on the basis of the value $ms_{SLL,adap}$, which is adapted at program point 215.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit including a drive unit of a motor vehicle having an internal combustion engine, said engine being equipped with a secondary air charger having a turbine, the method comprising the steps of:
    blowing secondary air into an exhaust gas system of said engine utilizing said secondary air charger;
    driving said secondary air charger via a pressure drop across an actuating element for adjusting an air supply to said engine;
    driving said actuating element for adjusting said air supply to said engine which is corrected in dependence upon an air mass flow driving said turbine of said secondary air charger; and,
    adapting a value of the air mass flow through said turbine by comparing a measured air supply to said engine to a modeled air supply to said engine.

2. The method of claim 1, wherein said actuating element is so driven that the air mass flow, which is to be supplied to said engine via said actuating element, corresponds to the total air mass flow less the air mass flow through said turbine.

3. The method of claim 1, comprising the further step of measuring the air supply to said engine with at least one of an air mass sensor and a pressure sensor.

4. The method of claim 1, comprising the further step of modeling the air supply to said engine in dependence upon the engine rpm and the position of said actuating element while considering the air mass flow through said turbine of said secondary air charger.

5. The method of claim 1, comprising the further step of detecting a defective operation of said secondary air charger when a measured oxygen concentration in said exhaust gas system deviates in magnitude by more than a pregiven threshold value from a pregiven oxygen concentration.

6. The method of claim 1, comprising the further step of detecting a defective operation of said secondary air charger when a measured air/fuel mixture ratio in said exhaust-gas system deviates in magnitude by more than a pregiven threshold from a pregiven value.

7. The method of claim 1, comprising the further step of detecting a defective operation of said secondary air charger when the adapted air mass flow through said turbine of said secondary air charger lies outside of a pregiven tolerance band.

8. The method of claim 7, comprising the further step of selecting said tolerance band in such a manner that said tolerance band includes a modeled value for the air mass flow through said turbine of said secondary air charger.

9. An arrangement for controlling a drive unit including a drive unit of a motor vehicle having an internal combustion engine, said engine having an exhaust-gas system and being equipped with a secondary air charger having a turbine, the arrangement comprising:

means for blowing secondary air into said exhaust-gas system of said engine utilizing said secondary air charger;

means for driving said secondary air charger via a pressure drop across an actuating element for adjusting an air supply to said engine;

control means for driving said actuating element for adjusting said air supply which is corrected in dependence upon an air mass flow driving said turbine of said secondary air charger; and means for adapting a value of the air mass flow through said turbine by comparing a measured air supply to said engine to a modeled air supply to said engine.

* * * * *